(12) United States Patent
Raynor

(10) Patent No.: US 7,604,281 B1
(45) Date of Patent: Oct. 20, 2009

(54) RAIN GUARD

(76) Inventor: Eileen M. Raynor, 8 Brookside Pl., Durham, NC (US) 27705

( * ) Notice: Subject to any disclaimer, the term of this patent is extended or adjusted under 35 U.S.C. 154(b) by 1 day.

(21) Appl. No.: 12/239,661

(22) Filed: Sep. 26, 2008

(51) Int. Cl.
*B60J 7/00* (2006.01)
(52) U.S. Cl. .................. 296/99.1; 296/152; 135/88.07
(58) Field of Classification Search .............. 296/99.1, 296/152; 135/88.07
See application file for complete search history.

(56) References Cited

U.S. PATENT DOCUMENTS

| 1,988,380 | A | | 1/1935 | Goldberg |
|---|---|---|---|---|
| 2,532,989 | A | | 12/1950 | Biondi |
| 4,171,013 | A | | 10/1979 | Clark |
| 4,201,412 | A | | 5/1980 | Williams et al. |
| 4,562,849 | A | | 1/1986 | Sirota |
| 5,230,545 | A | | 7/1993 | Huang et al. |
| 5,476,302 | A | * | 12/1995 | Ronci .................. 296/99.1 |
| 5,529,368 | A | | 6/1996 | Cui et al. |
| 6,019,414 | A | | 2/2000 | Pourciau, Sr. |
| 6,044,856 | A | | 4/2000 | Cano |
| 6,213,137 | B1 | | 4/2001 | Wang |
| 6,341,811 | B1 | | 1/2002 | Schoelkopf |

* cited by examiner

*Primary Examiner*—Joseph D Pape
(74) *Attorney, Agent, or Firm*—Levine Bagade Han LLP

(57) ABSTRACT

A rain guard assembly for providing shelter to an occupant entering or exiting a vehicle is described. Generally, the retractable rain guard assembly may comprise a housing integrally mounted within a roof of an automobile, a covering retractably held within the housing and having one or more engagement portions positioned along a free end of the covering, and one or more securement members positioned along a door of the automobile and aligned in a manner corresponding to positions of the one or more engagement portions. The one or more securement members are actuatable to engage to corresponding engagement portions such that opening of the door relative to the roof extends the covering therebetween. The covering may be engaged remotely, such as by a key fob, or automatically by a water detection sensor on the automobile.

10 Claims, 3 Drawing Sheets

RAIN GUARD

FIELD OF THE INVENTION

The present invention relates to a retractable rain guard assembly for use on an automobile. More particularly, the present invention relates to a retractable rain guard assembly which may be extended between the automobile roof and door when opened to provide temporary shelter from rain while entering or exiting from the automobile.

BACKGROUND OF THE INVENTION

When raining, entering or exiting an automobile while holding an open umbrella may be difficult particularly if the driver or passenger is holding other objects or assisting other passengers. The driver or passenger is typically exposed to the rain and the interior of the automobile is also exposed. Therefore, it is desirable to have an apparatus which can provide temporary shelter from the rain when a driver or passenger enters or exits an automobile.

Previous attempts have been made to address this matter. For example, U.S. Pat. No. 5,476,302 (Ronci) describes a rain and sun cover for an automobile that is attached at one end to a roller and die other end to the car door. This particular arrangement requires the placement of the housing within the vehicle cabin by the driver and the cover detachably mounted to attachment points at the top of the door to enable the cover to unroll when the door is opened. However, because the assembly housing is mounted within the vehicle cabin by the driver or passenger, this may interfere with the occupant comfort and may also inhibit operation of the vehicle. Moreover, this arrangement also requires the user to manually engage and disengage several attachment points between the cover and the door when the desired to be used. If the user were outside the vehicle during a rainstorm, the user would have to first open the door while manually attaching the covering to the door while remaining exposed to the elements.

Another attempt is shown in U.S. Pat. No. 6,044,856 (Cano) which describes a rain shielding canopy for use with an automobile comprising a housing assembly securely mounted to the roof and windshield pillar of the automobile. The housing assembly is attached to the roof of the car and accommodates a retractable waterproof cover. A corresponding mounting strip having a plurality of attachment hooks is fastened to the door for releasably engaging with the waterproof cover. Similarly, this arrangement requires the user to manually engage and disengage several hooks from the cover when desired to be used. Moreover, the housing assembly is attached along the roof possibly interfering with complete closure of the car door.

Accordingly, there is a need for a covering which provides temporary shelter from rain and the elements to drivers and/or passengers when entering or exiting from an automobile. Additionally, there is a need for a covering assembly which is unobtrusive to the driver or passenger and which can be automatically engaged when needed.

BRIEF SUMMARY OF THE INVENTION

In providing temporary shelter from the elements, such as rain, to occupants entering or exiting an automobile, a rain guard may be incorporated into the vehicle. Generally, one variation of the retractable rain guard assembly may comprise a housing integrally mounted within a roof of an automobile, a covering retractably held within the housing and having one or more engagement portions positioned along a free end of the covering, and one or more securement members positioned along a door of the automobile and aligned in a manner corresponding to positions of the one or more engagement portions, wherein the one or more securement members are actuatable to engage to corresponding engagement portions such that opening of the door relative to the roof extends the covering therebetween.

The covering may be fabricated from any variety of water-resistant materials (e.g., nylon, GORE-TEX (W.L. Gore & Assoc., Newark, Del.), latex, or any other number of water-resistant materials) and may be sized to extend between the roof (and optionally the pillar) and an opened door. The roof and/or pillar may retain an elongate housing assembly integrated within the structure or frame of the automobile such that the covering retractably housed within the assembly may be extended therefrom by the opening of door. As the door is closed, the covering may be retracted automatically within the housing assembly. The automobile may also incorporate an optional water-detection sensor which senses the presence of water upon the vehicle. When rain water is detected upon the windshield (or anywhere else on the car where the sensor or sensors may be located) a signal may be transmitted to a controller which may automatically engage the covering to the frame of door when the door is closed such that opening the door may automatically extend the covering without the user having to manipulate or manually secure the covering.

The free end of the covering may incorporate one or more engagement portions therealong for securement along the door where any number of securement mechanisms which are actuatable remotely as known to one of skill in the art, may be utilized. The door may incorporate one or more securement assemblies aligned integrally along the door frame and which are coupled electrically to a controller/antenna assembly. The controller/antenna assembly may be configured to receive signals (wired or wirelessly) transmitted from the water sensor to automatically actuate the assemblies to engage the covering to the door. Alternatively, the controller/antenna may be configured to receive signals remotely from one or more controllers located within the cabin of the vehicle which may be operated by the occupants to selectively engage the actuation assemblies. Additionally and/or alternatively, the controller/antenna may be configured to receive wireless signals remotely from a remote controller, e.g., key fob, having one or more controls which may be actuated to engage or disengage one or more coverings for one or more occupants entering or exiting from the vehicle.

DETAILED DESCRIPTION OF THE INVENTION

Figure 1A:
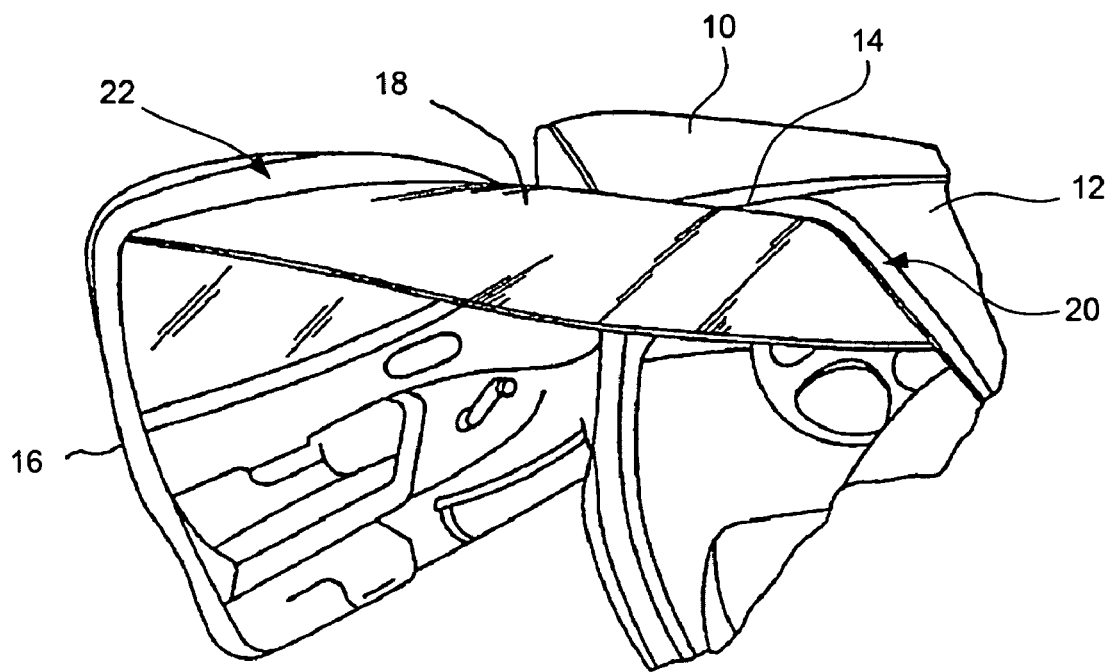
FIG. 1A shows a perspective view of an example of a retractable covering extended between the roof and door of an automobile to provide temporary shelter to a driver or passenger when entering or exiting the automobile.
Figure 1B:
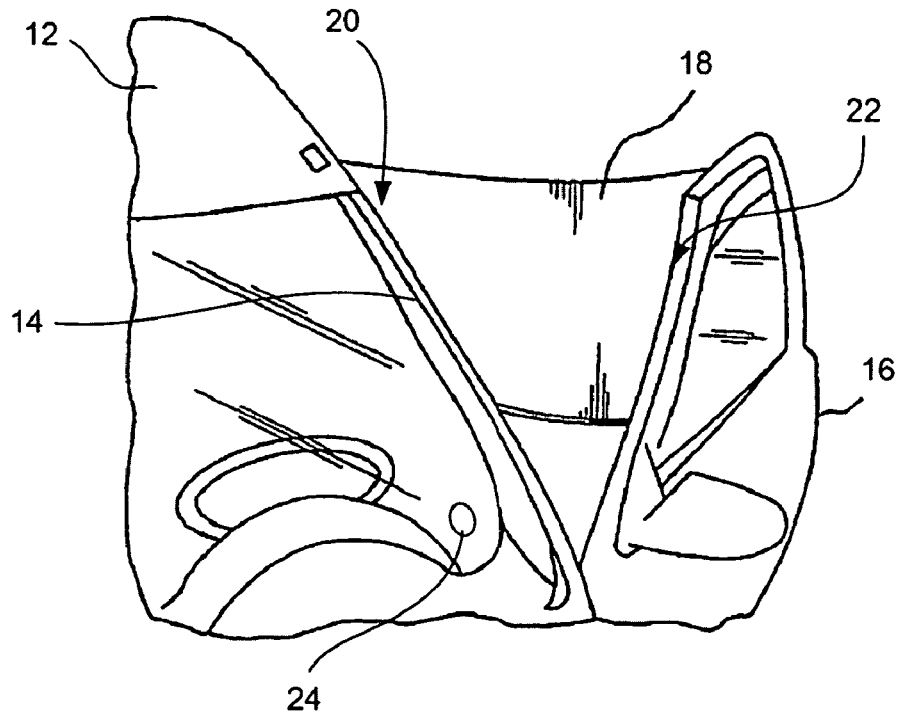
FIG. 1B shows another perspective view of the example from FIG. 1A.

In providing temporary shelter from the elements, such as rain, to occupants entering or exiting an automobile, a rain guard may be incorporated into the vehicle. As illustrated in the perspective views of FIGS. 1A and 1B, a covering 18 may be retractably housed within roof 12 (and optionally within pillar 14) of automobile 10. Although covering 18 is illustrated as extending over the driver's side entrance for illustrative purposes, covering 18 may be optionally incorporated for each opening into the automobile 10, e.g., passenger-side entrance as well as rear-occupant entrances.

Covering 18 may be fabricated from any variety of water-resistant materials (e.g., nylon, GORE-TEX (W.L. Gore & Assoc., Newark, Del.), latex, or any other number of water-resistant materials) and may be sized to extend between the roof 12 (and optionally pillar 14) and an opened door 16, as illustrated. The roof 12 and/or pillar 14 may retain an elongate housing assembly 20 integrated within the structure or frame of the automobile 10 such that the covering 18 retractably housed within assembly 20 may be extended therefrom by the opening of door 16, when engaged thereto, to provide the temporary shielding. As the door 16 is closed, covering 18 may be retracted automatically within housing assembly 20. Because housing assembly 20 may be integrated directly within the roof 12 and/or pillar 14 of the automobile 10, the housing assembly 20 remains unobtrusive and does not require positioning within the cabin of the vehicle. Moreover, the integrated nature of the housing 20 and covering 18 within the automobile roof 12 and/or pillar 14 avoids any interference with the aesthetics of the vehicle as the assembly remains hidden from view and further avoids any interference with operation of the vehicle such as closing of the door 16 against the vehicle frame or mis-matched alignment between the housing and securement to the door 16.

As the covering 18 is retractably housed within housing assembly 20 within the roof 12 and/or pillar 14, the free end of the covering 18 may be selectively engaged to the door 16 via a securement assembly 22 (as described in further detail below) when the covering 18 is desired to be deployed, such as during a rain storm.

Additionally, automobile 10 may further incorporate an optional water-detection sensor 24 which senses the presence of water upon the vehicle. Such sensors, which typically incorporate optical or electrical sensors to detect water, are commercially available for controlling devices such as windshield wipers and can also be utilized to automatically engage or disengage the covering 18 from door 16. Accordingly, when rain water is detected upon the windshield (or anywhere else on the car where the sensor or sensors 24 may be located) a signal may be transmitted to a controller (described below) which may automatically engage the covering 18 to the frame of door 16 when the door 16 is closed such that opening the door 16 may automatically extend the covering 18 without the user having to manipulate or manually secure the covering 18. Likewise, once any water has dried from the vehicle or is no longer detectable, the covering 18 may be automatically disengaged from door 16. Alternatively, the water-detection sensor 24 may simply alert, e.g., visually or audibly, the vehicle occupant who may then selectively engage the covering 18 to door 16 remotely via a key fob or via a control located within the vehicle.

Figure 2:
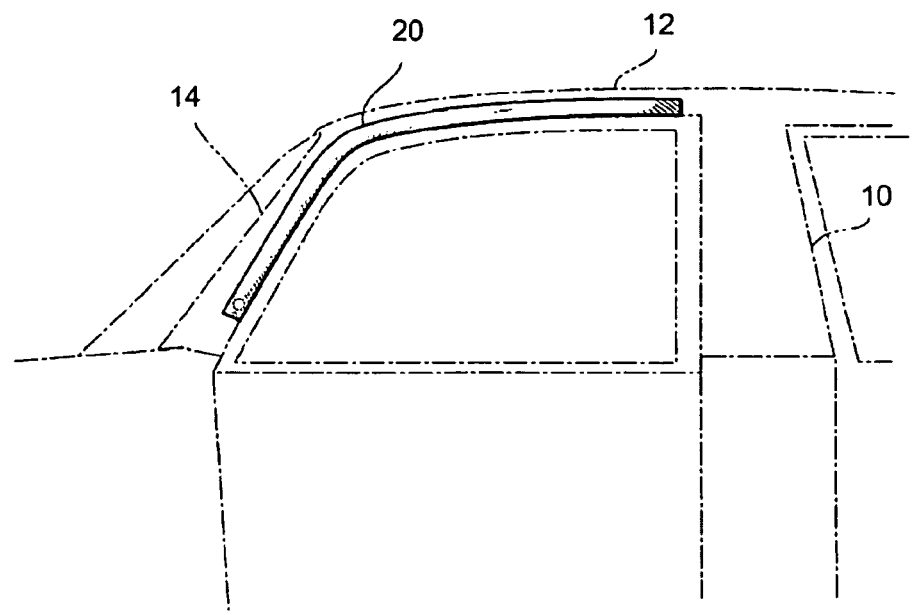
FIG. 2 shows a phantom side view of a housing assembly having a retracted covering integrated within the roof and/or pillar of an automobile.

FIG. 2 illustrates a side view in phantom of one example where the housing assembly 20 may be incorporated directly within the automobile 10 within a portion of the roof 12 and pillar 14. Depending upon how long the housing assembly 20 is designed, assembly 20 may be alternatively incorporated just within the roof 12 or just within the pillar 14 if so desired.

Figure 3:
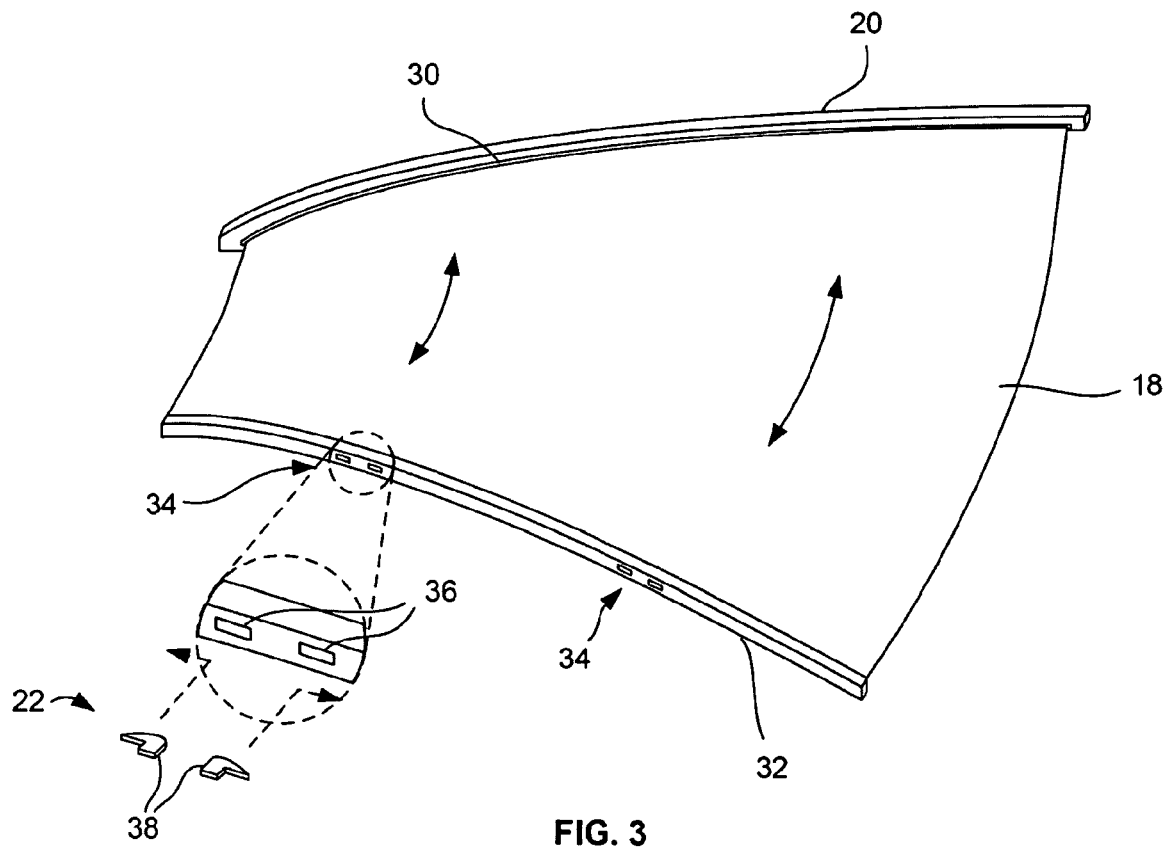
FIG. 3 shows a perspective view of the housing assembly with the covering partially extended therefrom.

FIG. 3 illustrates a perspective view showing the covering 18 extended at least partially from housing assembly 20 through an elongate slot or opening 30. Housing assembly 20 is shown as removed from automobile 10 for clarity and illustrative purposes. Moreover, housing assembly 20 may utilize a spring or other biasing mechanism which maintains covering 18 under tension such that covering 18 is automatically retracted within assembly 20 when disengaged from door 16. The free end 32 of covering 18 may incorporate one or more engagement portions 34 therealong for securement along door 16. The number of engagement portions 34 may be varied as well as their locations along the free end 32; however, this variation illustrates uniformly positioned engagement portions 34 for stability when engaged along door 16.

Each engagement portion 34 is illustrated in this variation as defining a pair of longitudinally-defined openings 36 which may correspondingly engage with a securement assembly 22 positioned along the door 16 where each engagement portion 34 and securement assembly 22 are aligned to be positioned in apposition when the door 16 is closed. This example illustrates securement assembly 22 as comprising a pair of securement members 38, e.g., oppositely aligned hooks or latches, which may be actuated to move in opposing directions once received within openings 36 to anchor and secure the free end 32 of covering 18 to door 16.

Although this example illustrates the securement assembly 22 as translatable hooks or latches, this is intended to be illustrative and not limiting such that other securement mechanisms which are actuatable remotely as known to one of skill in the art, may also be utilized. For example, other variations may include securement assembly 22 configured as electromagnets which may be actuatable between a non-magnetized and magnetized state to selectively engage with free end 32 which may incorporate complementary magnets or magnetically attractive materials for engagement with securement assembly 22.

Figure 4:
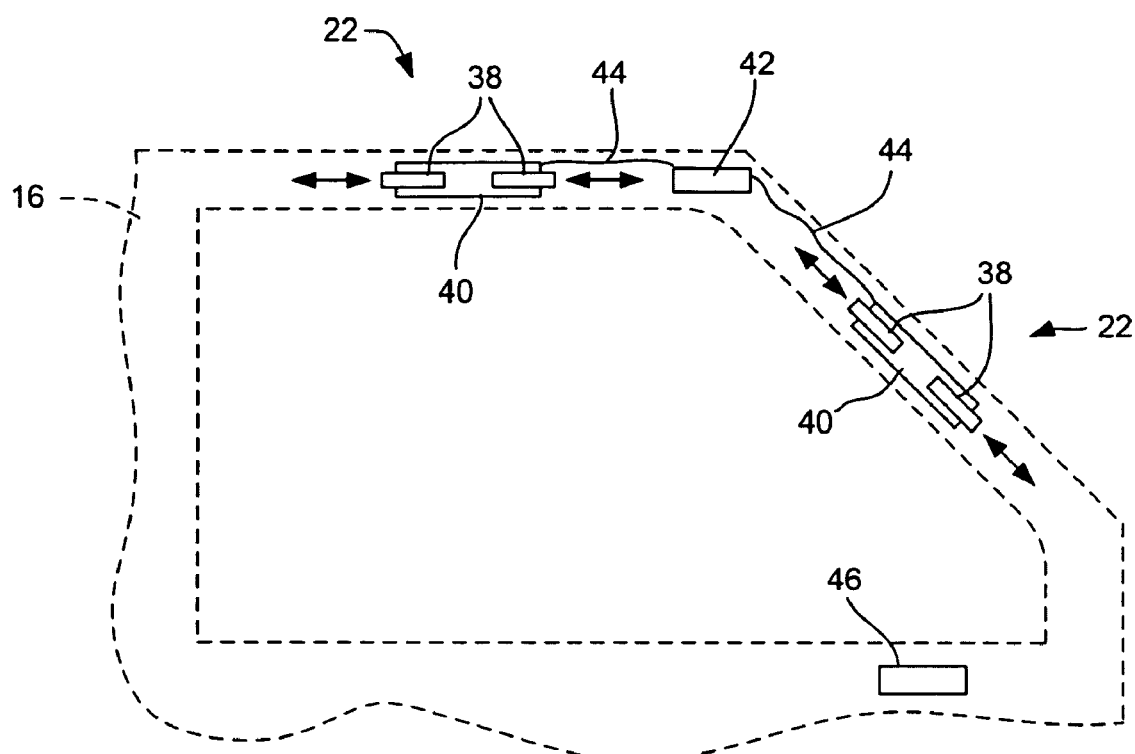
FIG. 4 shows a phantom side view of a securement assembly integrated within the door of the automobile.
Figure 5:
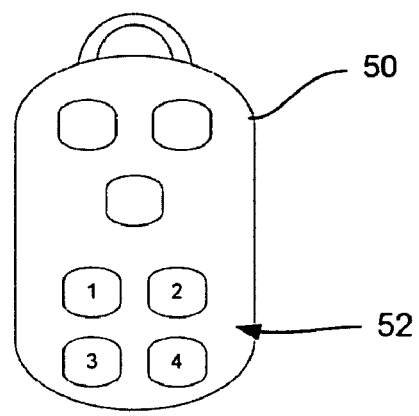
FIG. 5 shows an example of a key fob which may be used to remotely actuate the securement assembly for engaging the covering.

Turning now to the securement assembly 22 shown in the phantom side view of FIG. 4, door 16 may incorporate one or more securement assemblies 22 aligned integrally along the door frame. This variation illustrates the latch or hook securement members 38 extending from an actuation assembly 40 which may be coupled electrically to a controller/antenna assembly 42 via wires 44. Although controller/antenna assembly 42 is illustrated as being integrated within door 16, assembly 42 may be positioned elsewhere in the automobile 10 and coupled electrically or wirelessly with actuation assemblies 40. Controller/antenna assembly 42 may be configured to receive signals (wired or wirelessly) transmitted from sensor 24 to automatically actuate assemblies 40 to engage covering 18 to door 16. Alternatively, controller/antenna 42 may be configured to receive signals remotely from one or more controllers 46 located within the cabin of the vehicle which may be operated by the occupants to selectively engage the actuation assemblies 40. Additionally and/or alternatively, controller/antenna 42 may be configured to receive wireless signals remotely from a remote controller 50, e.g., key fob, having one or more controls 52 which may be actuated to engage or disengage one or more coverings 18 for one or more occupants entering or exiting from the vehicle, as shown in FIG. 5.

The applications of the disclosed invention discussed above are not limited to certain embodiments but may include any number of other variations. Modification of the above-described methods and devices for carrying out the invention and variations of aspects of the invention that are obvious to those of skill in the arts are intended to be within the scope of this disclosure. Moreover, various combinations of aspects between examples are also contemplated and are considered to be within the scope of this disclosure as well.

What is claimed is:

1. A retractable rain guard assembly, comprising:
    a housing integrally mounted within a roof of an automobile;
    a covering retractably held within the housing and having one or more engagement portions positioned along a free end of the covering;
    one or more securement members positioned along a door of the automobile and aligned in a manner corresponding to positions of the one or more engagement portions,
    wherein the one or more securement members are actuatable to engage to corresponding engagement portions such that opening of the door relative to the roof extends the covering therebetween.

2. The assembly of claim 1 wherein the housing is incorporated within the roof.

3. The assembly of claim 1 wherein the covering is retracted and maintained in a rolled configuration within the housing.

4. The assembly of claim 1 wherein the covering is comprised of a water resistant material.

5. The assembly of claim 1 wherein the one or more engagement portions comprise openings configured to receive a corresponding securement member.

6. The assembly of claim 1 wherein the one or more securement members comprise an anchoring member movable between a locking position and a releasing position.

7. The assembly of claim 1 wherein the one or more securement members comprise an actuatable electromagnet.

8. The assembly of claim 1 wherein the one or more securement members are remotely actuatable via a control.

9. The assembly of claim 8 wherein the control comprises a key fob.

10. The assembly of claim 1 further comprising a sensor mounted on the automobile which is configured to detect the presence of water, wherein the sensor is in communication with the one or more securement members such that the one or more securement members are engaged to the one or more engagement portions upon detection of water by the sensor.

* * * * *